(12) United States Patent
Hillier et al.

(10) Patent No.: US 11,624,837 B2
(45) Date of Patent: Apr. 11, 2023

(54) MULTI-RECEIVER SATELLITE-BASED LOCATION ESTIMATION REFINEMENT

(71) Applicant: Superpedestrian, Inc., Cambridge, MA (US)

(72) Inventors: Adam Christopher Hillier, Foster City, CA (US); Boaz Mamo, Sunnyvale, CA (US)

(73) Assignee: Superpedestrian, Inc., Cambridge, MA (US)

( * ) Notice: Subject to any disclaimer, the term of this patent is extended or adjusted under 35 U.S.C. 154(b) by 448 days.

(21) Appl. No.: 16/655,211

(22) Filed: Oct. 16, 2019

(65) Prior Publication Data

US 2021/0116576 A1 Apr. 22, 2021

(51) Int. Cl.
*G01S 19/31* (2010.01)
*G01S 19/10* (2010.01)
(Continued)

(52) U.S. Cl.
CPC .......... *G01S 19/072* (2019.08); *G01S 19/071* (2019.08); *G01S 19/10* (2013.01); *G01S 19/31* (2013.01); *G01S 19/33* (2013.01); *G06F 16/29* (2019.01)

(58) Field of Classification Search
CPC ...... G01S 19/071; G01S 19/072; G01S 19/10; G01S 19/31; G01S 19/33; G06F 16/29
See application file for complete search history.

(56) References Cited

U.S. PATENT DOCUMENTS 5,828,336 A * 10/1998 Yunck .................. G01S 19/072
342/357.31
6,295,022 B1 9/2001 Dutka
(Continued)

FOREIGN PATENT DOCUMENTS

JP 2001116820 A 4/2001
WO WO-0041403 A2 * 7/2000 ............... G01S 5/02
WO 2017181221 A1 10/2017

OTHER PUBLICATIONS

Iwabuchi, Tetsuya , et al., "Deformation Monitoring with Single Frequency L1 Receivers", ION GNSS 21st. International Technical Meeting of the Satellite Division, 2008, p. 3000-3008.
(Continued)

*Primary Examiner* — Daniel L Greene
(74) *Attorney, Agent, or Firm* — GTC Law Group PC & Affiliates

(57) ABSTRACT

A central location system provides an end-to-end high-accuracy positioning solution that provides navigation, geo-tagging, and general positioning data to receivers. The central location system does this by providing a cloud correction service and a robust positioning engine. For example, the central location system may provide single-frequency receivers with corrections for atmospheric delays and multipath throughout different geographic regions. The central location system computes corrections by leveraging location data from dual-frequency receivers. The central location system may also increase ionospheric delay coverage of portions of a geographic region. With increased ionospheric delay coverage, receivers can compute better location estimates. The central location system may also compute refined location estimates of single-frequency receivers and/or dual-frequency receivers for receivers with limited access to signals transmitted from satellites. The central location system may do this by estimating a receiver's location with respect to the location estimates of other receivers.

26 Claims, 10 Drawing Sheets

(51) Int. Cl.
*G01S 19/07* (2010.01)
*G06F 16/29* (2019.01)
*G01S 19/33* (2010.01)

(56) References Cited

U.S. PATENT DOCUMENTS

| | | | |
|---|---|---|---|
| 8,035,552 B2* | 10/2011 | Dai | G01S 19/32 |
| | | | 342/357.23 |
| 9,086,479 B2* | 7/2015 | Pratt | G01S 19/28 |
| 9,571,972 B2 | 2/2017 | Lection et al. | |
| 9,612,340 B1 | 4/2017 | Miller et al. | |
| 9,842,438 B1 | 12/2017 | Bradley et al. | |
| 10,690,775 B2 | 6/2020 | Jokinen | |
| 11,107,349 B2 | 8/2021 | Tang et al. | |
| 2005/0064878 A1 | 3/2005 | Omeagher | |
| 2010/0245168 A1 | 9/2010 | Rollet et al. | |
| 2011/0191052 A1 | 8/2011 | Lin et al. | |
| 2012/0129461 A1* | 5/2012 | Venkatraman | G01S 5/0236 |
| | | | 455/67.11 |
| 2012/0286991 A1* | 11/2012 | Chen | G01S 19/44 |
| | | | 342/357.23 |
| 2012/0315992 A1 | 12/2012 | Gerson et al. | |
| 2015/0338522 A1* | 11/2015 | Miller | G01S 19/35 |
| | | | 342/357.61 |
| 2015/0369924 A1* | 12/2015 | Hedgecock | G01S 19/51 |
| | | | 342/357.34 |
| 2016/0116601 A1* | 4/2016 | Horn | G01S 19/51 |
| | | | 342/357.27 |
| 2016/0316334 A1 | 10/2016 | Lection et al. | |
| 2017/0091223 A1* | 3/2017 | Arslan | H04W 64/00 |
| 2017/0166019 A1 | 6/2017 | Singh | |
| 2017/0276793 A1 | 9/2017 | Memarzadeh | |
| 2018/0273044 A1 | 9/2018 | Son | |
| 2019/0391276 A1 | 12/2019 | Kroeger et al. | |
| 2020/0124430 A1 | 4/2020 | Bradlow et al. | |
| 2020/0124737 A1* | 4/2020 | Hofmann | G01S 19/072 |
| 2020/0372790 A1 | 11/2020 | Ahmed et al. | |
| 2021/0001861 A1 | 1/2021 | Lobey | |
| 2021/0116574 A1 | 4/2021 | Hillier et al. | |
| 2021/0116575 A1 | 4/2021 | Hillier et al. | |
| 2021/0149060 A1 | 5/2021 | Limberger et al. | |
| 2021/0182704 A1 | 6/2021 | Mamo et al. | |

OTHER PUBLICATIONS

Mannucci, A.J , et al., "A New Method for Monitoring the Earth's Ionospheric Total Electron Content Using the GPS Global Network", Proceedings of the Institute of Navigation GPS-93, Sep. 1993, 11 pages.

Markovic, Milos , "Determination of Total Electron Content in the Ionosphere Using GPS Technology", Geonauka, vol. 2(2), 2014, 99. 1-9.

Wilson, Brian D., et al., "Instrumental Biases in Ionospheric Measurements Derived from GPS Data", Proceedings of the Institute of Navigation GPS-93, Sep. 1993, 9 pages.

\* cited by examiner

MULTI-RECEIVER SATELLITE-BASED LOCATION ESTIMATION REFINEMENT

CROSS REFERENCE TO RELATED APPLICATIONS

This application is related to U.S. application Ser. No. 16/655,209, entitled, ATMOSPHERIC DELAY ESTIMATION AND COMPENSATION FOR SINGLE-FREQUENCY RECEIVERS, and U.S. application Ser. No. 16/655,210, entitled UPDATING ATMOSPHERIC DELAY MODELS WITHIN A GEOGRAPHIC REGION, both filed on an even date herewith and incorporated herein by reference in their entirety for all purposes.

BACKGROUND

This description generally relates to satellite-based navigation systems and specifically to improving location estimations of receivers.

Current methods of computing accurate location estimations require receivers to receive unobscured signals transmitted from four or more satellites and to account for atmospheric delays in transmitted signals. However, environmental factors and device limitations often prevent receivers from meeting these requirements. Therefore, many users of standard receivers do not have access to accurate location estimates, especially in urban areas. For example, users in urban areas are often surrounded by buildings, which can reflect, scatter, and/or block signals transmitted from satellites. Because of this, the devices of users in urban areas often do not receive unobscured signals from four or more satellites, which is required to compute accurate location estimations using standard real-time kinematic (RTK) methods. Further, most standard devices are equipped with single-frequency receivers. Single-frequency receivers cannot compute atmospheric delays on their own, causing single-frequency receivers to compute location estimates with reduced accuracy.

SUMMARY

A central location system enables end-to-end high-accuracy positioning and provides navigation, geo-tagging, and general positioning data to receivers. The central location system can implement a cloud correction service and a robust positioning engine. For example, the central location system may provide single-frequency receivers with corrections for atmospheric delays and signal reception errors (e.g., reflected and/or blocked signals) throughout different geographic regions. The central location system may leverage location data from dual-frequency receivers that can more readily account for atmospheric delays. Using the location data from dual-frequency receivers, the central location system computes atmospheric delays for single-frequency receivers. Using the computed atmospheric delays, the single-frequency receivers may compute refined location estimations. Alternatively, the central location system may provide single-frequency receivers with atmospheric delay models, with which single-frequency receivers can compute measures of atmospheric delay.

The central location system may also increase ionospheric delay coverage to portions of a geographic region with insufficient ionospheric delay coverage. "Ionospheric delay coverage" refers to the accessibility of ionospheric delay measurements within a geographic region. As previously discussed, single-frequency receivers cannot compute atmospheric delays on their own. Therefore, when a single-frequency receiver is in an area with insufficient ionospheric delay coverage, the ability of the single-frequency receiver to compute an accurate location estimation is reduced. To combat this, the central location system identifies and relocates inactive dual-frequency receivers to areas within a geographic region with insufficient coverage. For example, the central location system may identify autonomous vehicles (e.g., autonomous scooters) with dual-frequency receivers that are within a threshold distance of an area with insufficient coverage. The central location system may then relocate the autonomous vehicle to the area. The central location system may also activate inactive autonomous vehicles within the area until the level of ionospheric coverage in the area is greater than or equal to a threshold level of coverage. Alternatively, the central location system may incentivize users of autonomous vehicles with dual-frequency receivers to relocate to areas with insufficient ionospheric delay coverage.

The central location system may also compute refined location estimates of single-frequency receivers and/or dual-frequency receivers that are susceptible to signal reception errors. Signal reception errors are positioning errors caused by blocked and/or reflected signals. Signals may be blocked or reflected when they interact with objects such as buildings and trees. Signal reception errors are especially prevalent in urban areas with high building density. Because of this, receivers in devices of users in urban area may not be able receive signals from four satellites, and thus may not be able to compute accurate location estimations. The central location system provides these receivers with refined location estimations using the location data of receivers with access to signals from four or more satellites. The central location system may do this by performing double difference operations between receivers with limited access to satellite signals and receivers with access to four or more satellite signals.

A BRIEF DESCRIPTION OF THE DRAWINGS

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

System Overview

Figure 1:
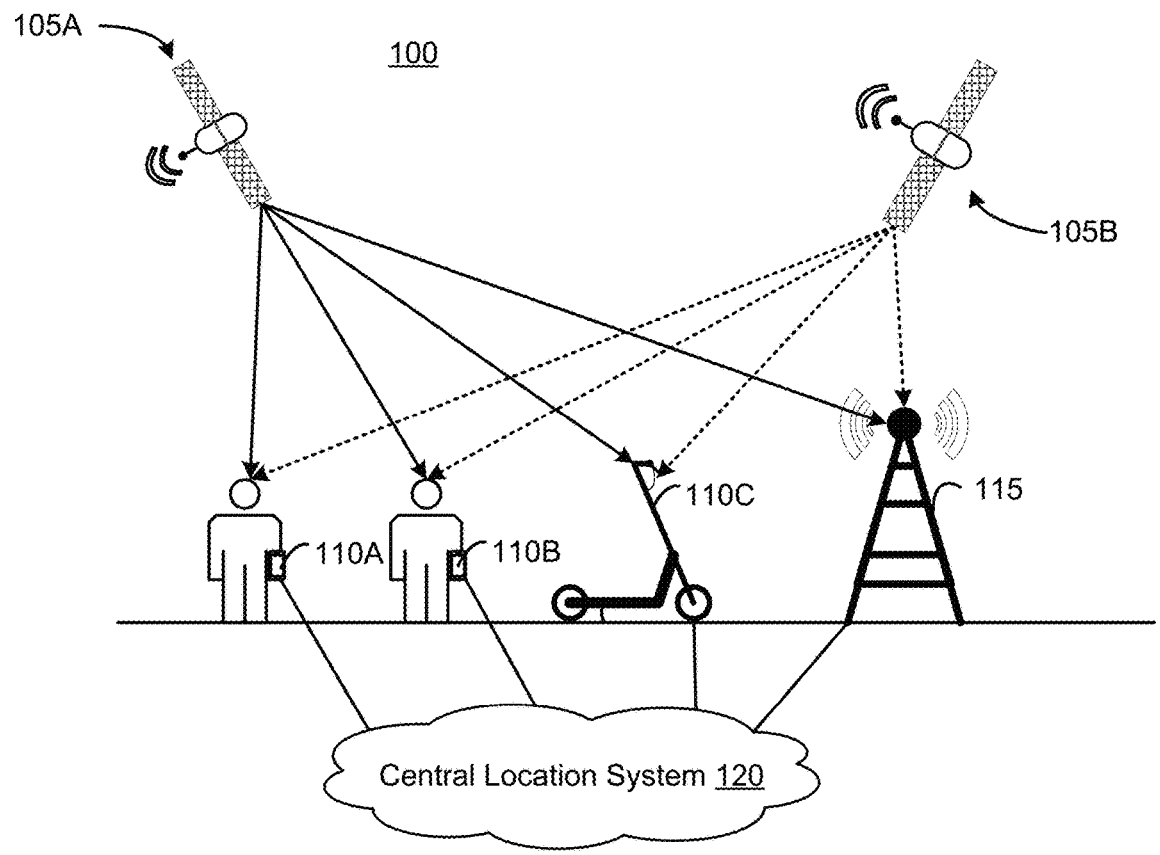
FIG. 1 illustrates a diagram of an environment of a central location system, according to one embodiment.

FIG. 1 illustrates a diagram of an environment of a central location system 120, according to one embodiment. The environment illustrated in FIG. 1 includes two satellites, namely satellite 105A and satellite 105B, users with receivers, namely receiver 110A, receiver 110B, an autonomous vehicle with a receiver, namely receiver 110C, a base station 115, and the central location system 120. In alternative configurations, different and/or additional components may be included in the environment 100.

Satellites 105A and 105B are satellites that are a part of a satellite-based navigation system. The satellites shown may be a part of any global navigation satellite system constellation, such as the Global Position System (GPS), Galileo, or GLONASS. Satellites 105A and 105B transmit signals that contain orbital data and a time each signal was transmitted. The orbital data of satellites 105A and satellite 105B allow receivers to estimate their location. For example, a receiver may use orbital data of two, three, or four satellites to estimate its location using trilateration.

A receiver, e.g., receiver 110A, receiver 110B, and receiver 110C, is a device that can receive signals from satellites 105A and 105B. Receivers may be able to receive signals from satellites in one or more constellations. Receivers may be single-frequency receivers, in which they only receive signals at one frequency from each satellite. For example, some single-frequency receivers may only receive a legacy signal, namely, a signal with a transmission frequency in the L1 band, for location estimation. Alternatively, receivers may be dual-frequency receivers, in which they receive signals at two transmission frequencies from each satellite. For example, some dual-frequency receivers may receive signals at transmission frequencies in the L1 and L2 bands or transmission frequencies in the L1 and L5 bands for location estimation. For a receiver to accurately and precisely determine its location, a receiver computes its location with respect to the locations of four or more satellites. By receiving signals from four satellites, a receiver can estimate its position with respect to three spatial dimensions (north/south, east/west, and altitude) and time.

Receivers may be integrated into various user devices, e.g., smartphones, laptops, scooters or other vehicles, laptops, etc., or may be dedicated receivers that are integrated into standalone devices. In instances in which a receiver is a part of a user device, the user device can execute an application that allows a user of the user device to interact with the central location system 120 via a user interface. For example, a web browser application may enable interaction between the user device and the central location system 120 via a network, or a graphical user interface may be provided as part of a software application published by the central location system 120 and installed on the user device. Alternatively, a user device interacts with the central location system 120 through an application programming interface (API) running on a native operating system of the user device, such as IOS® or ANDROID™.

Base station 115 is a transceiver that is a part of a global navigation satellite system. The base station 115 acts as a monitoring center for the satellites in the global navigation satellite system's constellation. The base station 115 may monitor the orbit coordinates of satellites, determine time errors, and calculate positional and time-based corrections. Correction data computed by the base station 115 may be propagated to satellites in the constellation. For example, a main station may propagate correction factors to satellites to correct time biases. Similarly, base station 115 may propagate correction factors to receivers.

The central location system 120 is an end-to-end high-accuracy positioning solution that provides navigation, geotagging, and general positioning data to receivers. The central location system 120 provides a cloud correction service and a robust positioning engine. The central location system 120 is further described in detail below, with reference to FIG. 2. For example, the central location system may provide single-frequency receivers with corrections for atmospheric delays and signal reception errors throughout different geographic regions. Using these corrections, receivers may remotely compute accurate positions ("edge computations"). The central location system 120 may also increase ionospheric delay coverage to portions of a geographic region with insufficient ionospheric delay coverage. The central location system 120 may also compute refined location estimates of single-frequency receivers and/or dual-frequency receivers with limited access to signals transmitted from satellites.

In some embodiments, the central location system 120 is configured to communicate with receivers 110A, 110B, and 110C via a network. The network may include any combination of local area and/or wide area networks, using both wired and/or wireless communication systems. In one embodiment, a network includes communication links using technologies such as Ethernet 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network may be represented using any suitable format, such as hypertext markup language (HTML) or extensible markup language (XML). In some embodiments, all or some of the communication links of a network may be encrypted using any suitable technique or techniques.

Central Location System

Figure 2:
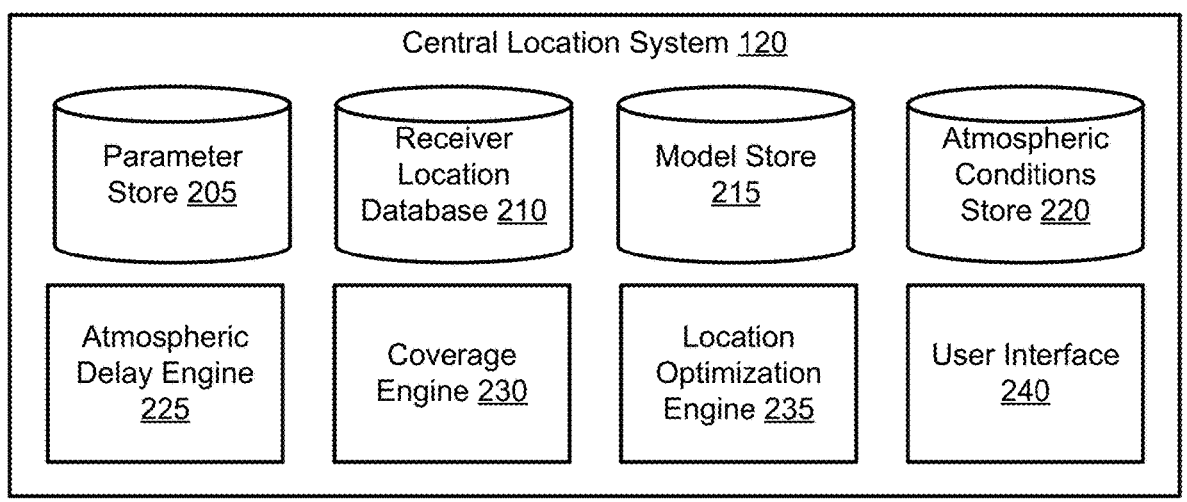
FIG. 2 is a block diagram of an architecture of the central location system, according to one embodiment.

FIG. 2 shows one embodiment of the central location system 120 of FIG. 1. In the embodiment show in FIG. 2, the central location system 120 includes a parameter store 205, a receiver location database 210, a model store 215, an atmospheric conditions store 220, an atmospheric delay engine 225, a coverage engine 230, a location optimization engine 235, and a user interface 240. In other embodiments, the central location system 120 includes different and/or additional elements. In addition, the functions may be distributed among the elements in a different manner than described.

The central location system 120 maintains model parameters in the parameter store 205. Examples of model parameters include conversion factors, bias and noise terms, clock errors, instrumental delays, and the like. Model parameters may be maintained for models generated by the atmospheric delay engine 225, coverage engine 230, the location optimization engine 235, and models that are used for training and validation. In some embodiments, model parameters may be stored remotely and accessed through a network. Model parameters may be updated in accordance with updates made to any models maintained by the central location system 120. Parameters may also be updated in accordance with changes in atmospheric conditions, or updated at certain predetermined time intervals.

The receiver location database 210 stores location data associated with single- and dual-frequency receivers. Location data may be obtained from receivers, satellites, and/or base stations. Location data may include location estimates from receivers with limited access to satellite signals and receivers with sufficient access to satellite signals. In some embodiments, elements of the central location system 120 update and refine the location estimates of receivers with limited access to satellite signals with the location data of receivers with sufficient satellite access. In alternative embodiments, the central location system 120 may also transmit correction and/or state information to receivers to allow edge computation of accurate positions. In these embodiments, the central location system 120 stores the edge computations of receivers in the receiver location database 210. In some embodiments, the receiver location database 210 may also store the location data of base stations and satellites in various constellations. Updates to the location data may be performed in accordance with model updates, changes in atmospheric conditions, predetermined time intervals, and the like. Further, the receiver location database 210 may store training data for models stored in the model store 215. Examples of training data may include location data of stationary receivers, location data of base stations, atmospheric delays, and the like. Alternatively, elements of the central location system 120 may be trained by a different system and copied to the central location system 120 once trained and validated. In such cases, the receiver location database 210 may not contain training data.

Models generated by elements of the central location system 120 are maintained in the model store 215. Models may include atmospheric delay models for computing the atmospheric delay of a receiver, location models to compute a refined location estimate of a receiver, ionospheric delay coverage models to compute the ionospheric delay coverage of a geographic region, and the like. The model store 215 may also maintain training models that are used for model training, validation, and testing elements of the central location system 120.

Atmospheric conditions of geographic regions are maintained in the atmospheric conditions store 220. Atmospheric conditions may be used by the central location system 120 to compute atmospheric delays in signals transmitted from satellites in various geographic regions. Examples of atmospheric conditions include measurements or representations of temperature, pressure, relative humidity, hydrostatic and wet component delays, absorption, scattering, emission, air pollution, and the like. In some embodiments, atmospheric conditions are retrieved from external databases in communication with the central location system 120. The atmospheric conditions store 220 may also maintain data on changes in atmospheric conditions. Based on these changes, elements of the central location system 120 may update their respective models, recompute location information of receivers and/or satellites, or transmit updated correction and/or state information to receivers to allow edge computation of accurate positions.

The atmospheric delay engine 225 provides single-frequency receivers with measures of atmospheric delay. Atmospheric delays may include ionospheric delays, which are caused by the influence of ionospheric conditions on wave propagation through the ionosphere. Atmospheric delays may also include tropospheric errors resulting from influences of tropospheric conditions on wave propagation through the troposphere 325 and instrumental delays. Receivers can compute more accurate location estimates when the atmospheric delays of signals are accounted for, discussed in detail with reference to FIG. 3. The atmospheric delay engine 225 provides single-frequency receivers with a measure of atmospheric delay by generating atmospheric delay models using atmospheric delay measurements and location data from dual-frequency receivers. The atmospheric delay engine 225 may generate different atmospheric delay models for different geographic regions. Using the atmospheric delay models and an approximate location of a single-frequency receiver, the atmospheric delay engine 225 may compute a measure of atmospheric delay for the single-frequency receiver. In these embodiments, a single-frequency receiver can compute its location using the atmospheric delay terms computed by the atmospheric delay engine 225. In other embodiments, the atmospheric delay engine 225 provides an atmospheric delay model to a single-frequency receiver. The single-frequency receiver can compute an atmospheric delay and location estimation for the single-frequency receiver remotely using the atmospheric delay model. Alternatively, the atmospheric delay engine 225 may compute the atmospheric delays and the locations of single-frequency receivers, and may provide each single-frequency receivers with a more refined location estimation.

The coverage engine 230 measures ionospheric delay coverage within portions of geographic regions to identify which portions of the geographic regions need additional ionospheric delay coverage. Ionospheric delay coverage refers to the accessibility of ionospheric delay measurements within a geographic region. The coverage engine 230 provides threshold levels of ionospheric delay coverage by relocating receivers to areas with insufficient coverage and/or activating inactive receivers. For example, when a portion of a geographic region has a measure of ionospheric delay coverage less than a threshold level of coverage, the coverage engine 230 may identify and activate inactive receivers within the portion of the geographic region until the measure of ionospheric delay coverage is greater than or equal to the threshold level of coverage. Alternatively, the coverage engine 230 may relocate receivers within a threshold distance of the portion of the geographic region with insufficient coverage until the level of coverage is at least the threshold level of coverage. The coverage engine 230 may find and reroute autonomous vehicles (e.g., scooters, bicycles, drones, robots, and the like), and/or may incentivize users of receivers to relocate to the portion of the geographic region. The coverage engine 230 may also map and schedule routes for various autonomous vehicles to maintain a threshold level of coverage throughout a geographic region. For example, the coverage engine 230 may schedule deliveries for delivery vehicles that include receivers in accordance with factors that affect satellite coverage within a region (e.g., such that the delivery vehicle passes through the region throughout an hourly basis, daily basis, weekly basis, etc.).

The location optimization engine 235 computes improved location estimates for single- and dual-frequency receivers with insufficient satellite coverage. For example, receivers with insufficient satellite coverage may only receive signals from one or two satellites; however, to compute a precise location estimate, receivers may need to receive signals from at least four satellites. The location optimization engine 235 computes an improved location estimate by using location information from additional receivers with sufficient satellite coverage. In some embodiments, the location optimization engine 235 uses the location information of the additional satellites to perform double differencing operations between additional receivers and the receiver with insufficient satellite coverage. In some embodiments, the location optimization engine 235 computes the updated location estimate by performing a least squares regression operation on the locations of the additional receivers and the approximate location of the receiver with insufficient satellite coverage. In other embodiments, the location optimization engine 235 may use other estimation techniques, such as Bayesian regression, generalized regression, weighted regression, and partial regression. Alternatively, the location optimization engine 235 gathers, organizes, and distributes relevant information from receivers that receive signals transmitted from at least four satellites to receivers that receive signals transmitted from fewer than four satellites. Using the relevant information, the receivers can use any suitable technique to perform edge computations of accurate positions. Relevant information may include the location information of the at least four satellites, the location information of the receivers, atmospheric delays, and the like. The location optimization engine 235 may also compute multipath effects resulting from the reflection, scattering, and/or deflection of signals off reflective surfaces. The location optimization engine 235 may then distribute the multipath effects to receivers. Additionally, the location optimization engine 235 may predict when a receiver is likely to experience multipath or when a receiver won't have a line of sight to a satellite. The location optimization engine 235 may provide the predictions to the receivers. Receivers can then leverage the predictions through dismissal, deweighting, or some other suitable correction technique during position computation.

The user interface 240 allows users to interact with the central location system 120. Through the user interface 240, a user may request an updated location estimation, view topographical maps of atmospheric delays within a geographical region, view measures of satellite coverage, predictions of when multipath will be experienced, and the like. The user interface 240 may provide interface elements that allow users to modify how elements of the central location system 120 are calibrated and tested, how frequently training is performed, which parameters are used during modeling, and the like.

Figure 3:
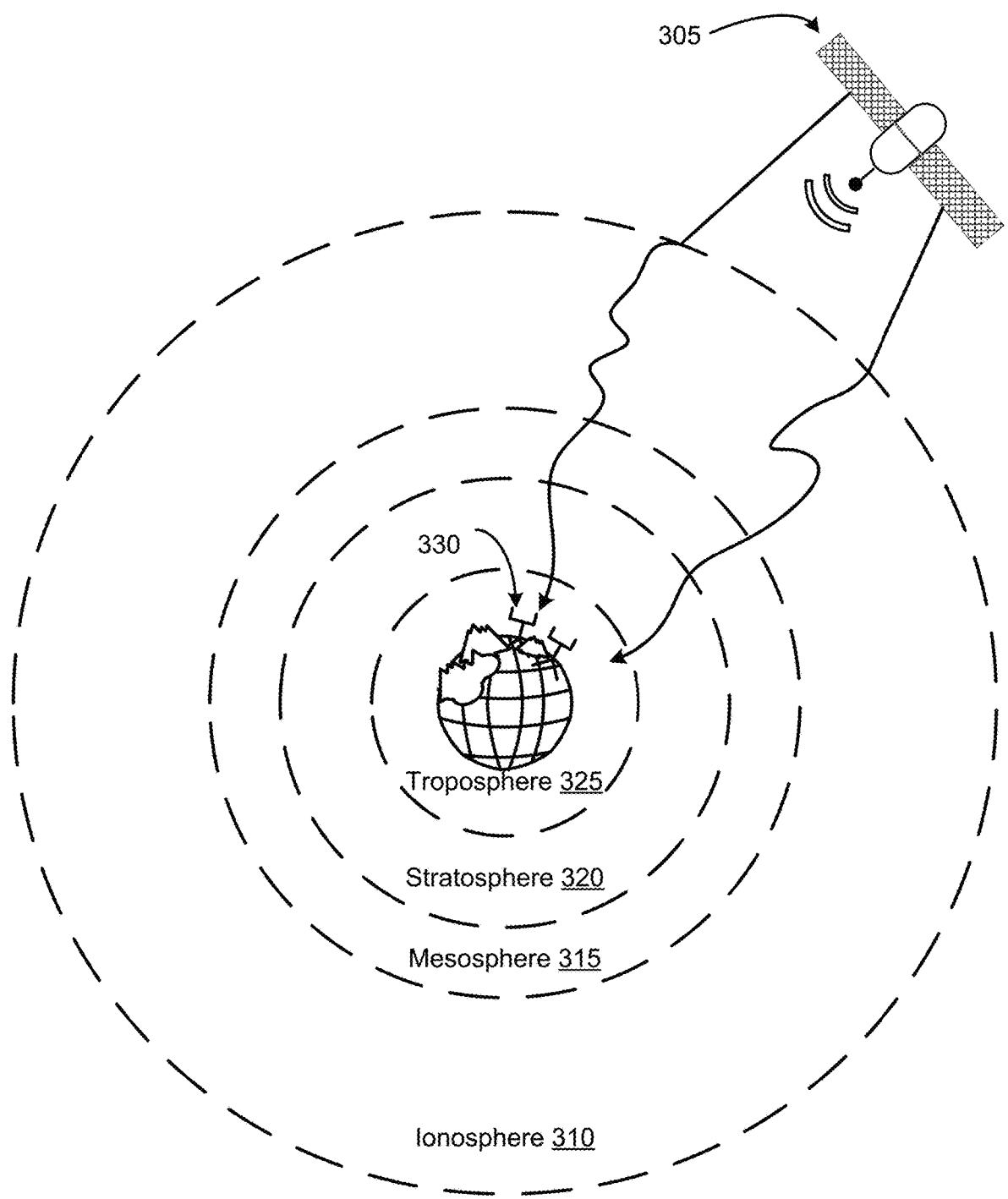
FIG. 3 illustrates the effects of the atmosphere on signals transmitted from satellites, according to one embodiment.

FIG. 3 illustrates one embodiment of the effects of the atmosphere on signals transmitted from satellites, e.g., satellite 305. Signals transmitted through the atmosphere are primarily affected by the conditions in the ionosphere and the troposphere, in addition to multipath effects resulting from interactions between signals and reflective surfaces. As signals are transmitted, they may be delayed as they travel through the ionosphere 310 and the troposphere 325. For example, the wave propagation of a signal is influenced by free electrons in the ionosphere that result from the ionization of gas molecules by UV rays. Similarly, variations in temperature, pressure, and relative humidity throughout the troposphere 325 also affect wave propagation, causing tropospheric delays. Because of these delays, the signals received by a receiver, e.g., receiver 330, may not accurately reflect the location of satellites. However, receivers cannot accurately compute location estimations without the correct location information of the satellites from which they receive signals.

Therefore, equations for receiver position measurements, e.g., carrier phase measurements (Equation 1) and code measurements (Equation 2), include terms that account for the atmospheric conditions that influence the propagation of transmitted signals.

Carrier phase position measurements can be computed according to Equation 1, which includes terms for the tropospheric error and ionospheric delays of a geographic region.

$$\phi_s^i = \|\vec{r}_s - \vec{r}_i\| + c(\delta t_s - \delta t^i) + Tr - \tilde{\alpha}_l(I + K_{21}) + B_i + \lambda_i \omega + m_i + \in_i \quad (1)$$

In Equation 1, the "units" of each of the terms is "number of wavelengths", $\phi_s^i$ is the carrier phase measurement from satellite i at receiver s, $\|\vec{r}_s - \vec{r}_i\|$ is the range between receiver s and satellite i, c is the speed of light, $\delta t_s$ is the receiver clock error, $\delta t^i$ is the satellite clock error, Tr is the tropospheric range error and is commonly modeled by the equation $Tr = M_{dry} Z_{dry} + M_{wet} Z_{wet}$, $\tilde{\alpha}_l$ is a frequency dependent conversion factor and $$\tilde{\alpha}_l = \frac{1}{\tilde{\gamma}_{i,i+1} - 1},$$

I is the ionospheric delay, $K_{21}$ is the differential code biases (DCB) and is a function of the equipment and the ionosphere, $B_i$ is the bias term, $\lambda_i$ is the wavelength, co is the windup, $m_i$ is the carrier phase multipath term, and $\in_i$ is the noise term.

Code phase position measurements can be computed according to Equation 2, which also include terms for atmospheric delays, such as an ionospheric delay term and a tropospheric delay term.

$$R_s^i = \|\vec{r}_s - \vec{r}_i\| + c(\delta t_s - \delta t^i) + Tr + \tilde{\alpha}_l(I + K_{21}) + \mu_i + \in_i \quad (2)$$

In Equation 2, the "units" of each of the terms is a measure of length, such as meters, $R_s^i$ is the code measurement from satellite i at receiver s, and $\mu_i$ is the code multipath term.

The more components of either Equation 1 or Equation 2 a receiver can use to compute a location estimate, the more accurate the location estimate is. Therefore, for a receiver to compute a refined location estimate, atmospheric dependencies can be considered. Alternatively, when some or all of the atmospheric dependencies can be eliminated, as is the case with dual-frequency receivers, a receiver can compute a more accurate location estimation, for instance using a "geometry-free combination." For example, the ionospheric delay terms are eliminated by dual-frequency receivers because they are frequency dependent. Therefore, dual-frequency receivers can compute the ionospheric delay and DCB of a geographic region using the geometry-free combination. The central location system 120 leverages the location and atmospheric delay estimations computed by dual-frequency receivers to provide single-frequency receivers with measures of atmospheric delays and/or more refined location estimations, discussed in detail with reference to FIG. 4.

Figure 4:
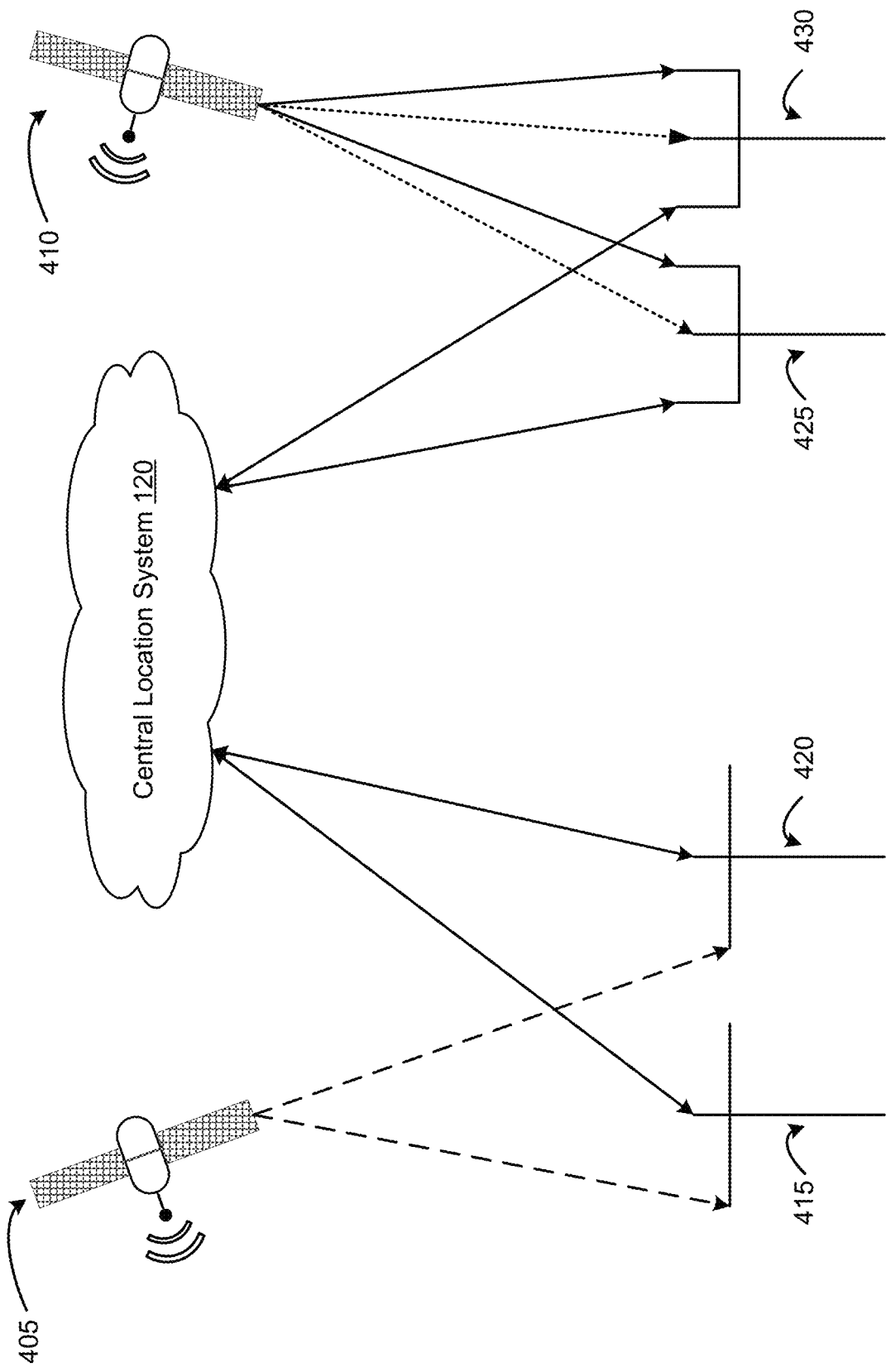
FIG. 4 illustrates a process of providing single-frequency receivers with atmospheric delay measurements, according to one embodiment.

FIG. 4 illustrates a process of providing single-frequency receivers with atmospheric delay measurements, according to one embodiment. As shown, two satellites, satellite 405 and satellite 410, transmit signals at a plurality of frequencies that are received by single-frequency receivers (single-frequency receiver 415 and single-frequency receiver 420) and dual-frequency receivers (dual-frequency receiver 425 and dual-frequency receiver 430). As shown, the single-frequency receivers receive one signal transmitted from each satellite, and the dual-frequency receivers receive two signals transmitted from each satellite. The receivers are also in communication with the central location system 120, shown as double-headed arrows.

As discussed with respect to Equation 1 and Equation 2, the receivers have computational dependencies based on atmospheric conditions. However, many of these computational dependencies are eliminated for dual-frequency receivers. For example, the ionospheric delay term may be eliminated when combining dual-frequency measurements, such as in an ionosphere-free combination. Further, dual-frequency receivers can combine measurements to isolate or eliminate terms which are frequency dependent (scaled by the factor $\tilde{\alpha}_i$). These aspects enable dual-frequency receivers to compute measures of atmospheric delay and more refined location estimations.

The central location system 120 leverages the measures of atmospheric delay of dual-frequency receivers to estimate the measures of atmospheric delay of single-frequency receivers. Examples of atmospheric delays estimated by the central location system 120 may include ionospheric delays and tropospheric delays. The central location system 120 estimates a measure of atmospheric delay of a single-frequency receiver by generating and applying an atmospheric delay model to a location approximation of the single-frequency receiver. The atmospheric delay model maps the location approximation to a measure of atmospheric delay of that location. The single-frequency receiver can use the atmospheric delay estimated by the central location system 120 to estimate a more accurate location of the single-frequency receiver. Alternatively, or additionally, the central location system 120 may provide an atmospheric delay model to single frequency receivers. Using the atmospheric delay model, the single frequency receivers may remotely compute measures of atmospheric delay and accurate location estimations.

The central location system 120 may generate an atmospheric delay model using measures of atmospheric delay and location data received from dual-frequency receivers within a geographic region. An atmospheric delay model may be a two-dimensional curve corresponding to a geographic area fit to the measures of atmospheric delay received from dual-frequency receivers within the geographic area. In some embodiments, the central location system 120 aggregates measures of atmospheric delay and location data from dual-frequency receivers located approximately every 5 kilometers, 10 kilometers, 20 kilometers, or any distance in each direction to estimate atmospheric influences. In this way, an atmospheric delay model roughly represents, for a particular geographic region, an average or weighted average of nearby dual-frequency receiver-measured atmospheric delays. The central location system 120 may generate additional and/or alternative models that map others measures of delay (e.g., instrumental delay) in a two-dimensional space to a function that describes the measures of delay for the entire space (e.g., geographical region).

In some embodiments, the central location system 120 can compute atmospheric delays for single-frequency receivers using the atmospheric delay model. The single-frequency receivers may then use the atmospheric delays to compute more refined location estimations. In other embodiments, the central location system 120 provides the single-frequency receivers with the atmospheric delay model such that the single-frequency receivers compute the atmospheric delays remotely. Alternatively, the central location system 120 may compute both the atmospheric delays and the updated locations of the single-frequency receivers and provide the updated location estimations to the single-frequency receivers. In some embodiments, the central location system 120 also generates a regional map of the ionosphere. The central location system 120 may provide the map to a user on an interface of a user device.

Figure 5:
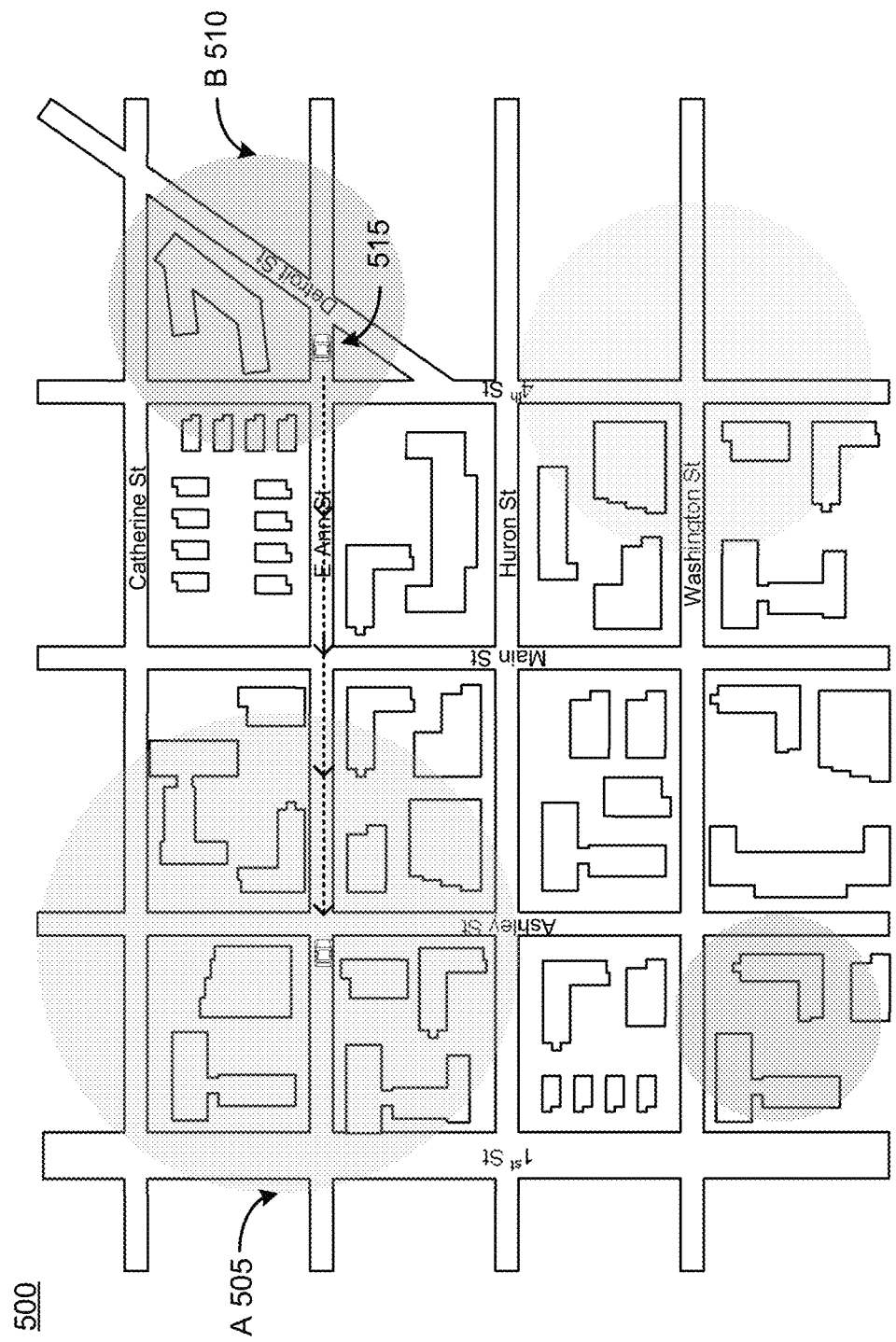
FIG. 5 illustrates a process of increasing ionospheric delay coverage in geographic regions, according to one embodiment.

FIG. 5 illustrates a process of increasing ionospheric delay coverage in geographic regions, according to one embodiment. Ionospheric delay coverage refers to the accessibility of ionospheric delay measurements within a geographic region estimated by an ionospheric delay model. When ionospheric delay coverage in a geographic region is sufficient (e.g., the geographic region has at least a threshold level of ionospheric delay coverage), single-frequency receivers in the geographic region can consider the ionospheric delay terms when computing location estimations. When ionospheric delay coverage in a geographic region is insufficient (e.g., the geographic region has less than a threshold level of ionospheric delay coverage), receivers may not be able to take the ionospheric delay terms into account during position computation, reducing location estimation accuracy. An area may have insufficient ionospheric delay coverage because there are not enough dual-frequency receivers located within the area for an ionospheric delay model to accurately represent the ionospheric delay of the area. By increasing the number of dual-frequency receivers in an area, the central location system 120 can produce ionospheric delay models that provide more reliable estimates of ionospheric delay. In some embodiments, ionospheric delay models are generated in accordance with the methods described with reference to FIG. 4.

In some embodiments, a geographic region has an insufficient level of coverage when a measure of ionospheric delay hasn't been received from a location within a threshold distance of the region or a location within the region for a threshold amount of time. In some embodiments, a geographic region has an insufficient level of coverage when measures of ionospheric delay have not been received by at least a threshold number of receivers within a threshold distance of the region. In some embodiments, a geographic region has an insufficient level of coverage when an ionospheric delay model for the geographic region hasn't been updated within a threshold period of time. In some embodiments, a geographic region has an insufficient level of coverage when a comparison statistic (e.g., ratio, fraction, and difference) between an expected measure of an ionospheric delay and a realized measure of an ionospheric delay received from a dual-frequency receiver within the geographic region is greater than a threshold value.

In the embodiment shown, the central location system 120 identifies measures of ionospheric delay coverage within portions of a geographic region. When the ionospheric delay coverage in a portion of the geographic region is insufficient, e.g., is less than a threshold level of coverage, the central location system 120 can take remedial steps to increase the ionospheric delay coverage of the portion. To do this, the central location system 120 can relocate dual-frequency receivers to portions with insufficient coverage or activate inactive dual-frequency receivers already located in the portion with insufficient coverage. The central location system 120 can then use the location and atmospheric delay data computed by the relocated and/or activated dual-frequency receivers to generate and/or update an ionospheric delay model that provides estimates of ionospheric delays. Using the estimated ionospheric delays, receivers can estimate more accurate locations. Alternatively, the central location system 120 can transmit the ionospheric delay model to receivers within the geographic region so that the receivers can compute measures of ionospheric delay remotely using the model and an approximate location estimation.

In the illustration shown, Area A 505 has an insufficient level of ionospheric delay coverage. To increase the level of ionospheric delay coverage in Area A 505, the central location system 120 may identify a receiver 515 within a threshold distance of Area A 505. For example, the central location system 120 may identify a dual-frequency receiver 515 in Area B 510, which is within a threshold distance of Area A 505. The central location system 120 can activate the dual-frequency receiver in Area B 510 such that is relocates to Area A 505. For example, if the dual-frequency receiver 515 is an autonomous scooter or other vehicle, the central location system 120 can program the scooter to travel from Area B 510 to Area A 505. The central location system 120 uses the refined location estimations and atmospheric delay terms computed by the dual-frequency receiver 515 to provide additional coverage to receivers within Area A 505, as discussed with reference to FIG. 3 and FIG. 4. In some embodiments, the central location system 120 may program the dual-frequency receiver 515 so that is stays within Area A 505 until the level of coverage in Area A 505 is greater than or equal to a threshold level of ionospheric delay coverage.

Alternatively, if the autonomous scooter is in use, the central location system 120 may incentivize a user of the autonomous scooter to relocate to Area A 505 until the level of coverage in Area A 505 is greater than or equal to a threshold level of ionospheric delay coverage. In alternative embodiments, the central location system 120 may identify and activate inactive receivers in Area A 505. For example, an autonomous scooter with a dual-frequency receiver in Area A 505 may be powered off. The central location system 120 may activate the scooter or the receiver of the scooter (e.g., without activating the remainder of the scooter) so that it can provide Area A 505 with additional ionospheric delay coverage. Further, the central location system 120 may schedule a route for dual-frequency receivers to follow within a geographic region such that a threshold level of ionospheric delay coverage is maintained throughout the geographic region. For example, the central location system 120 may schedule deliveries by autonomous vehicles, such as scooters, drones, or robots, along routes so that a threshold level of coverage is maintained throughout the geographic region.

Figure 6:
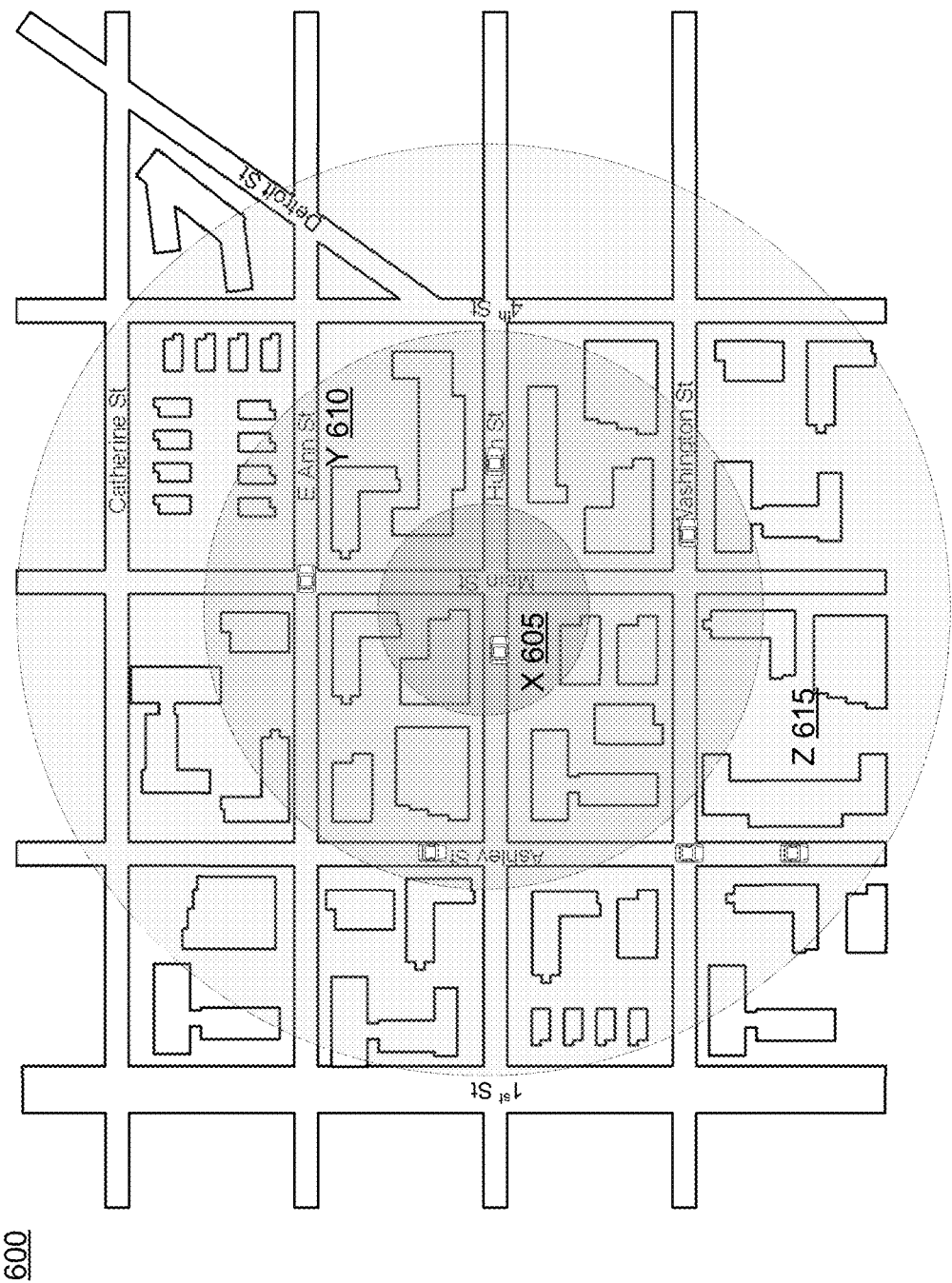
FIG. 6 illustrates the variation in satellite visibility throughout a geographic region, according to one embodiment

FIG. 6 illustrates the variation in satellite visibility throughout a geographic region 600, according to one embodiment. For a receiver to compute a refined location estimation, the receiver often needs an unobstructed line of sight to at least four satellites within a constellation. This allows the location estimation of the receiver to be computed with respect to time and the dimensions north/south, east/west, and altitude. However, satellite coverage within portions of a geographic region may be affected by the spatial arrangement of buildings, vegetation, landmarks, and the like. For example, a downtown of an urban area be more susceptible to multipath or limited access to line of sight views of satellites because of higher building concentrations. Because of this, receivers located in downtowns may not receive signals from enough satellites to compute accurate location estimates. Therefore, the central location system 120 provides a means for receivers with reduced satellite visibility to compute more accurate positions. The central location system 120 does this by leveraging the location data of receivers with sufficient satellite visibility. For example, receivers on the outskirts of a downtown may receive signals transmitted from four or more satellites. The central location system 120 may use the location data from these receivers and satellite measurements to compute and transmit correction and/or state information to receivers to allow edge computation of accurate positions by receivers with limited satellite access. The central location system 120 may also use the location data of receivers and satellite measurements to locally compute and transmit more refined location estimations to receivers with insufficient satellite visibility.

As shown in FIG. 6, receivers in Area Y 610 may have a higher level of satellite visibility than receivers in Area X 605, and receivers in Area Z 615 may have a higher level of satellite visibility than receivers in Area Y 610. For example, receivers within Area X 605 may only receive signals from two satellites because signals transmitted from other satellites are blocked or distorted by buildings. Similarly, the receivers within Area Y 610 may only receive signals transmitted from three satellites. Receivers on the outskirts of the downtown, i.e., receivers in Area Z 615 may receive signals transmitted by four or more of the satellites. As a result, receivers in Area Z 615 can more precisely compute their location than receivers in Area Y 610, which can more precisely compute their location than receivers in Area X 605. To provide receivers within Area X 605 more refined location estimates, the central location system 120 computes the location of receivers within Area X 605 with respect to the locations of receivers within Areas Y 610 and/or Area Z 615, discussed in detail with reference to FIG. 7 and FIG. 8. Alternatively, the central location system 120 may transmit the location data of receivers in Areas Y 610 and/or Area Z 615 and the satellite measurements in the line of sight of receivers in Areas Y 610 and/or Area Z 615 to the receivers in Area X 605. The receivers in Area X 605 may then remotely compute location estimation using the transmitted data.

Figure 7:
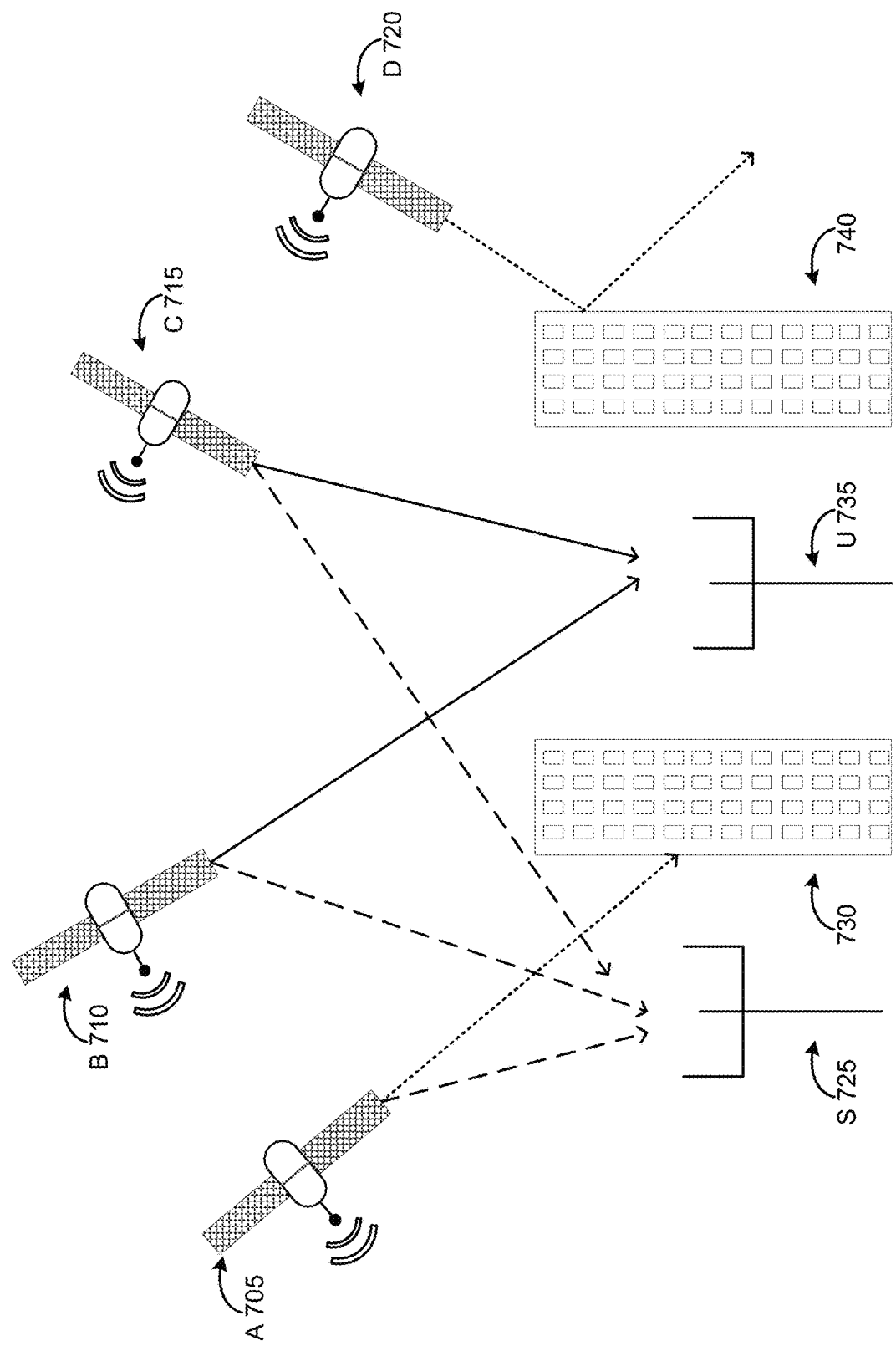
FIG. 7 illustrates the effect of signal reception errors have on location estimation, according to one embodiment.

FIG. 7 illustrates the effect of signal reception errors on location estimation, according to one embodiment. Signal reception errors are position errors that occur because of reduced or obscured satellite visibility (e.g., when signals transmitted from satellites are blocked or scattered by an object before received by a receiver). For example, a building may block a signal completely, or a signal may be reflected off a building so that a receiver receives two out-of-phase signals from the same satellite. As previously discussed, for a receiver to compute a refined location using standard real-time kinematic (RTK) methods, a receiver receives signals transmitted from four or more satellites. This is because standard real-time kinematic methods use a system of at least three equations to solve for each parameter of a receiver's position relative to a base station—delta latitude, delta longitude, and delta altitude. Therefore, standard RTK methods are less feasible when satellite visibility is obscured.

As shown, receiver S 725 and receiver U 735 are on the ground, and four satellites are in orbit, satellite A 705, satellite B 710, satellite C 715, and satellite D 720. Both receivers receive signals from satellite B 710 and satellite C 715. However, the signal transmitted from satellite A 705 is blocked from receiver U 735 by building 730 and the signal transmitted from satellite D 720 is blocked from receiver U 735 by building 740. Therefore, receiver U 735 does not receive signals from either satellite A 705 or satellite D 720. Since receiver U 735 only receives signals transmitted from two satellites, it is unable to compute its position using standard RTK methods. Instead of using standard RTK methods to compute the position of receiver U 735, the central location system 120 may compute a refined location estimation of receiver U 735 using the location data of receivers in areas with better satellite visibility. For example, the central location system 120 may compute the location of receiver U 735 with respect to the location estimation of receiver S 725, discussed in detail with reference to FIG. 8. The central location system 120 may also compute and transmit updated correction and/or state information to receivers to allow remote computation of accurate positions. The central location system 120 may also predict when a receiver is likely to experience multipath or when a receiver may not have a line of sight to a satellite. The central location system 120 provides the predictions to the receiver so that the receiver can leverage the predictions during position estimation.

Figure 8:
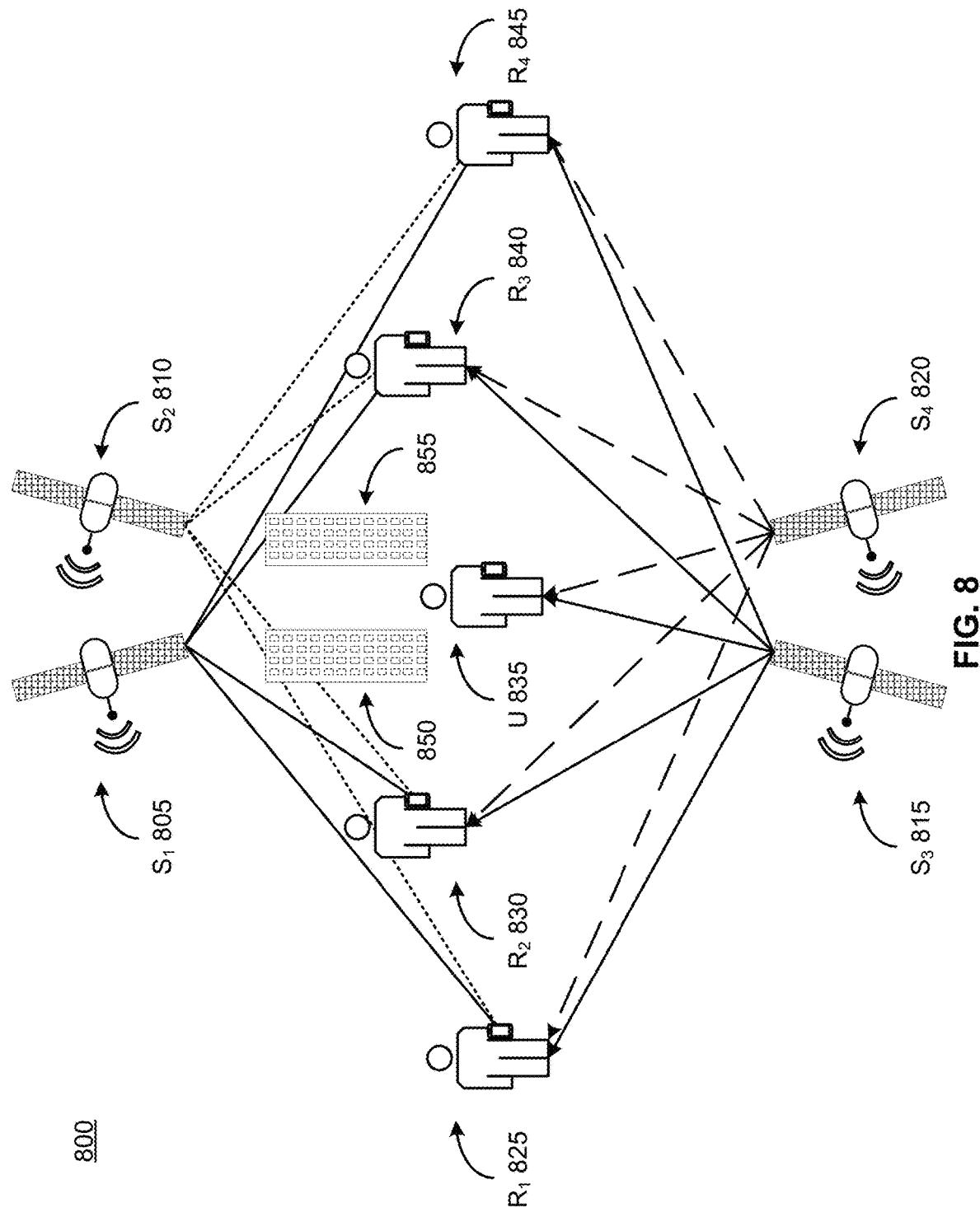
FIG. 8 illustrates a process of computing a refined location estimation of a receiver with reduced satellite visibility, according to one embodiment.

FIG. 8 illustrates a process of computing a refined location estimation of a receiver with reduced satellite visibility, according to one embodiment. The illustration shows four satellites in orbit, $S_1$ 805, $S_2$ 810, $S_3$ 815, $S_4$ 820, and five receivers on the ground, $R_1$ 825, $R_2$ 830, $R_3$ 840, $R_4$ 845, and U 835. The receivers on the outskirts of the geographic region 800, $R_1$ 825, $R_2$ 830, $R_3$ 840, $R_4$ 845, receive signals from all four satellites, $S_1$ 805, $S_2$ 810, $S_3$ 815, $S_4$ 820. However, due to the position of receiver U 835 within the geographic region 800, receiver U 835 may only receive signals transmitted from two satellites, $S_3$ 815 and $S_4$ 820. Receiver U 835 may not receive signals transmitted from either satellite $S_1$ 805 or $S_2$ 810 because of multipath. For example, buildings 850 and 855 may scatter, deflect, or block the signals transmitted from satellites $S_1$ 805 or $S_2$ 810 such that they are not received by receiver U 835. Because receiver U 835 only receives signals from two satellites, $S_3$ 815 and $S_4$ 820, it can only compute an approximate location.

As discussed with reference to FIG. 7, the central location system 120 may compute a refined location estimation of a receiver with insufficient satellite visibility using the location information of receivers with sufficient satellite visibility. Alternatively, the central location system 120 may transmit correction and/or state information from receivers with sufficient satellite coverages to a receiver with insufficient satellite coverage to allow edge computation of accurate positions. In some embodiments, for a receiver to have sufficient satellite visibility, it receives signals transmitted from four or more satellites. In some embodiments, receivers with insufficient satellite visibility still receive signals transmitted from at least two satellites. Further, in some embodiments, to compute a refined location estimation, each of the receivers with sufficient satellite visibility receive a signal from at least one satellite in common with the receiver with insufficient visibility. As shown, all receivers $R_1$ 825, $R_2$ 830, $R_3$ 840, $R_4$ 845, and U 835 receive signals from satellites $S_3$ 815 and $S_4$ 820.

A refined location of a receiver may be estimated by computing a Jacobian of the receiver's position with respect to double difference observables between the receiver and four or more receivers with sufficient satellite visibility. For example, a refined location of receiver U's 835 position may be computed with respect to the location of receivers $R_1$ 825, $R_2$ 830, $R_3$ 840, and $R_4$ 845. Typical double difference measurements are computed as the dot product of a line of sight vector between a receiver and a satellite and a relative position vector between two receivers according to Equation 3.

$$\Delta \nabla_{i\text{-}U} = \overrightarrow{LOS_i} \cdot \vec{\rho}_i \qquad (3)$$

In Equation 3, $\overrightarrow{LOS_i}$ is a line of sight vector between an $i^{th}$ receiver with sufficient coverage (e.g., receiver $R_1$ 825, $R_2$ 830, $R_3$ 840 or $R_4$ 845) and a satellite, $\vec{\rho}_i$ is the relative position vector between receiver U 835 and the $i^{th}$ receiver, and the symbol · represents a dot product.

However, because receiver U 835 only receives signals from two satellites, a precise value of $\vec{\rho}_i$ is unknown and the double difference measurement cannot be computed according to Equation 3. To combat this, the relationship between $\vec{\rho}$ and the absolute position vectors of the receivers in an absolute coordinate system (Equation 4) may be used to bypass solving for $\vec{\rho}$ directly.

$$\vec{\rho} = \vec{R}_i - \vec{U} \qquad (4)$$

In Equation 4, $\vec{R}_i$ is the position vector of the $i^{th}$ receiver with sufficient coverage in an absolute coordinate system and $\vec{U}$ is the position vector of receiver U 835 in the absolute coordinate system. Substituting Equation 4 into Equation 3 yields Equation 5.

$$\Delta \nabla i\text{-}U = \overrightarrow{LOS_i} \cdot \vec{R}_i - \overrightarrow{LOS_i} \cdot \vec{U} \qquad (5)$$

A matrix of the double difference measurements between receiver U 835 and each of the four receivers $R_1$ 825, $R_2$ 830, $R_3$ 840, and $R_4$ 845, $\underline{\Delta \nabla_{i\text{-}U}}$, is generated, shown in Equation 6. In some embodiments, the double difference measurements may include range or geometry-free combinations.

$$\underline{\Delta \nabla_{i\text{-}U}} = \underline{H} \times U + \underline{B} \qquad (6)$$

In Equation 6, the symbol × represents a multiplication operation. $\underline{H}$ is a Jacobian of the receivers' position with respect to the receivers' observables, and is defined by Equation 7.

$$\underline{H} = \left[\frac{\partial \vec{x}}{\partial O_n}\right] = \begin{bmatrix} \frac{\partial \text{North}}{\partial \Delta \nabla_{1-U}} & \frac{\partial \text{East}}{\partial \Delta \nabla_{1-U}} & \frac{\partial \text{Up}}{\partial \Delta \nabla_{1-U}} \\ \frac{\partial \text{North}}{\partial \Delta \nabla_{2-U}} & \frac{\partial \text{East}}{\partial \Delta \nabla_{2-U}} & \frac{\partial \text{Up}}{\partial \Delta \nabla_{2-U}} \\ \vdots & \vdots & \vdots \end{bmatrix} = [\overrightarrow{LOS_i}] \qquad (7)$$

In Equation 6, $\underline{B}$ is an offset term matrix that tethers the position of receiver U 835 to receivers $R_1$ 825, $R_2$ 830, $R_3$ 840, and $R_4$ 845, and may be defined by Equation 8.

$$\underline{B} = [\overrightarrow{LOS_i} \cdot \vec{R}_i] \qquad (8)$$

Alternatively, or additionally, $\underline{B}$ can be expressed to account for carrier phase ambiguities by including the carrier phase ambiguities in the state/position vectors in Equation 8. Carrier phase ambiguities may then be resolved by solving for $\underline{B}$ instead of solving for the position of receiver U 835, $\vec{U}$.

When the position of receiver U 835 is being solved for, the absolute position vector of receiver U 835, $\vec{U}$, may be approximated according to Equation 9.

$$\underline{\underline{H}} \times \vec{U} = \begin{bmatrix} \Delta \nabla_{1-U} - \overrightarrow{LOS_1} \cdot \vec{R_1} \\ \Delta \nabla_{2-U} - \overrightarrow{LOS_2} \cdot \vec{R_2} \\ \Delta \nabla_{3-U} - \overrightarrow{LOS_3} \cdot \vec{R_3} \\ \Delta \nabla_{4-U} - \overrightarrow{LOS_4} \cdot \vec{R_4} \end{bmatrix} \qquad (9)$$

In some embodiments, $\vec{U}$ is not solved independently of $\underline{\underline{H}}$. Instead, $\underline{\underline{H}} \times \vec{U}$ may be solved as a single value by setting Equation 9 to a predetermined value and iterating through different values of $\underline{\underline{H}}$, $\vec{U}$, or a combination thereof until a solution of $\underline{\underline{H}} \times \vec{U}$ is reached. In some embodiments, $\vec{U}$ may be identified indirectly by solving for a local optimum of $\underline{\underline{H}}$ (e.g., a local maximum or minimum of $\underline{\underline{H}}$) by iterating through different values of $\vec{U}$. For example, a solver may be used to find a local maximum solution of $\underline{\underline{H}}$ using a least squares optimizer to approximate a refined location estimation of receiver U 835. $\underline{\underline{H}}$ may also be approximated using other estimation techniques, such as Bayesian regression, generalized regression, weighted regression, and partial regression techniques. The position of receiver U 835 is then approximated using the values of $\vec{U}$ that are associated with the local optimum of $\underline{\underline{H}}$.

Figure 9:
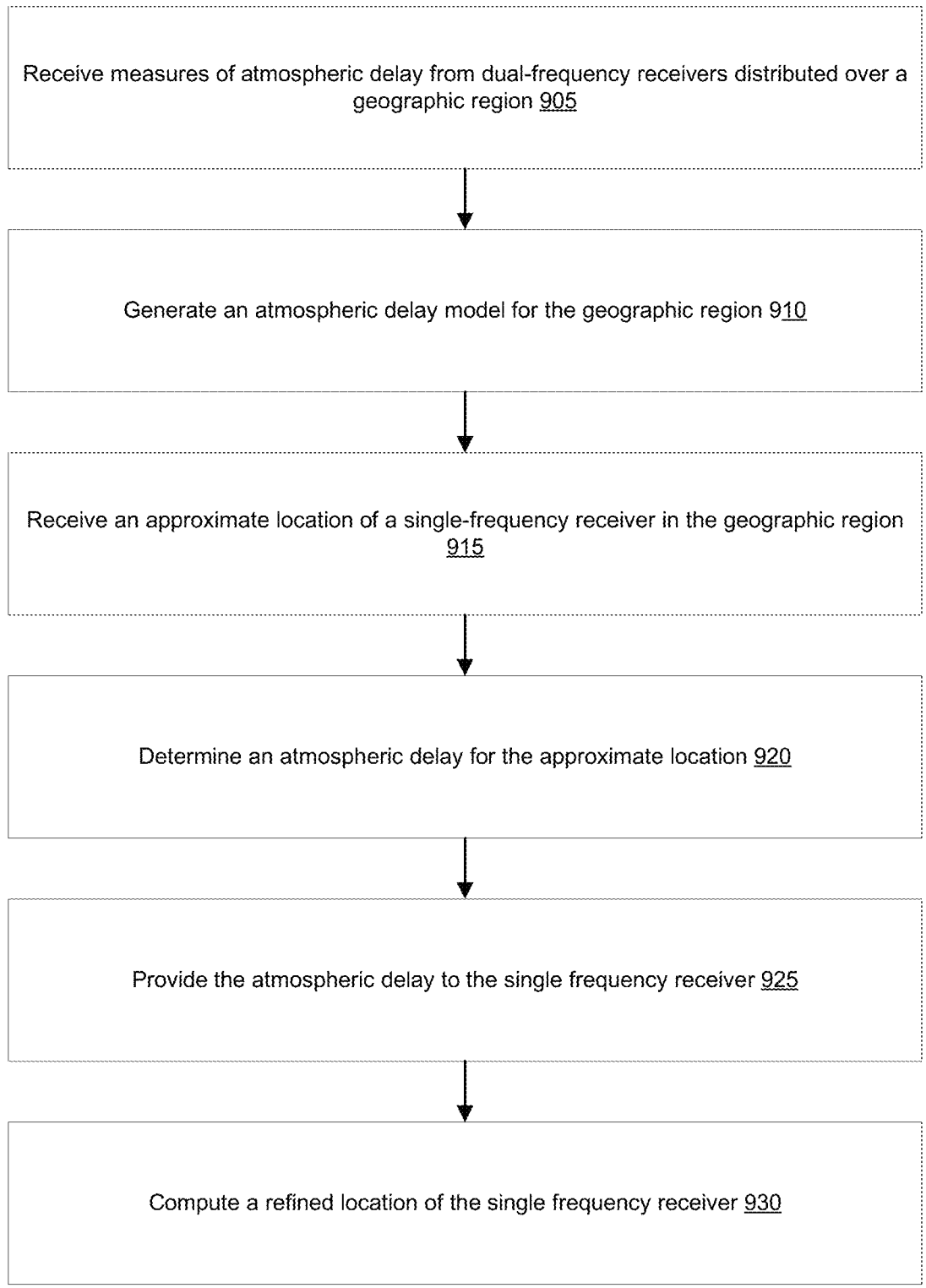
FIG. 9 is a flow chart illustrating a method of providing a dual-frequency receiver with a refined location estimation, according to one embodiment.

FIG. 9 is a flow chart illustrating a method of providing a dual-frequency receiver with a refined location estimation. In the method shown, measures of atmospheric delay are received 905 from dual-frequency receivers distributed over a geographic region. The received measures of atmospheric delay may include measures of an ionospheric delay, tropospheric delay, or instrumental delay. In some embodiments, measures of atmospheric delay are filtered by the dual-frequency receivers. In other embodiments, the central location system 120 filters the measures of atmospheric delay locally.

An atmospheric delay model is generated 910 for the geographic region. In some embodiments, the atmospheric delay model may be generated and/or trained by identifying, for each dual-frequency receiver, a time differential between time stamps of two signals of different transmission frequencies received by the dual-frequency receiver. In some embodiments, an approximate location of a single-frequency receiver in the geographic region is received 915. An atmospheric delay for the approximate location of the single-frequency receiver is determined 920 using the atmospheric delay model. The atmospheric delay is provided 925 to the single-frequency receiver. The single-frequency receiver computes 930 a refined location estimation of itself using the atmospheric delay. In alternative embodiments, the central location system 120 provides the single-frequency receiver with the atmospheric delay model. In these specific embodiments, the single-frequency receiver uses the atmospheric delay model to compute the atmospheric delay and a refined location estimation of itself. In some embodiments, the central location system 120 may generate a topographical map of the atmospheric delay over the geographic region based on the atmospheric delay model. The central location system 120 may also generate a user interface on a user device that includes the topographical map.

Figure 10:
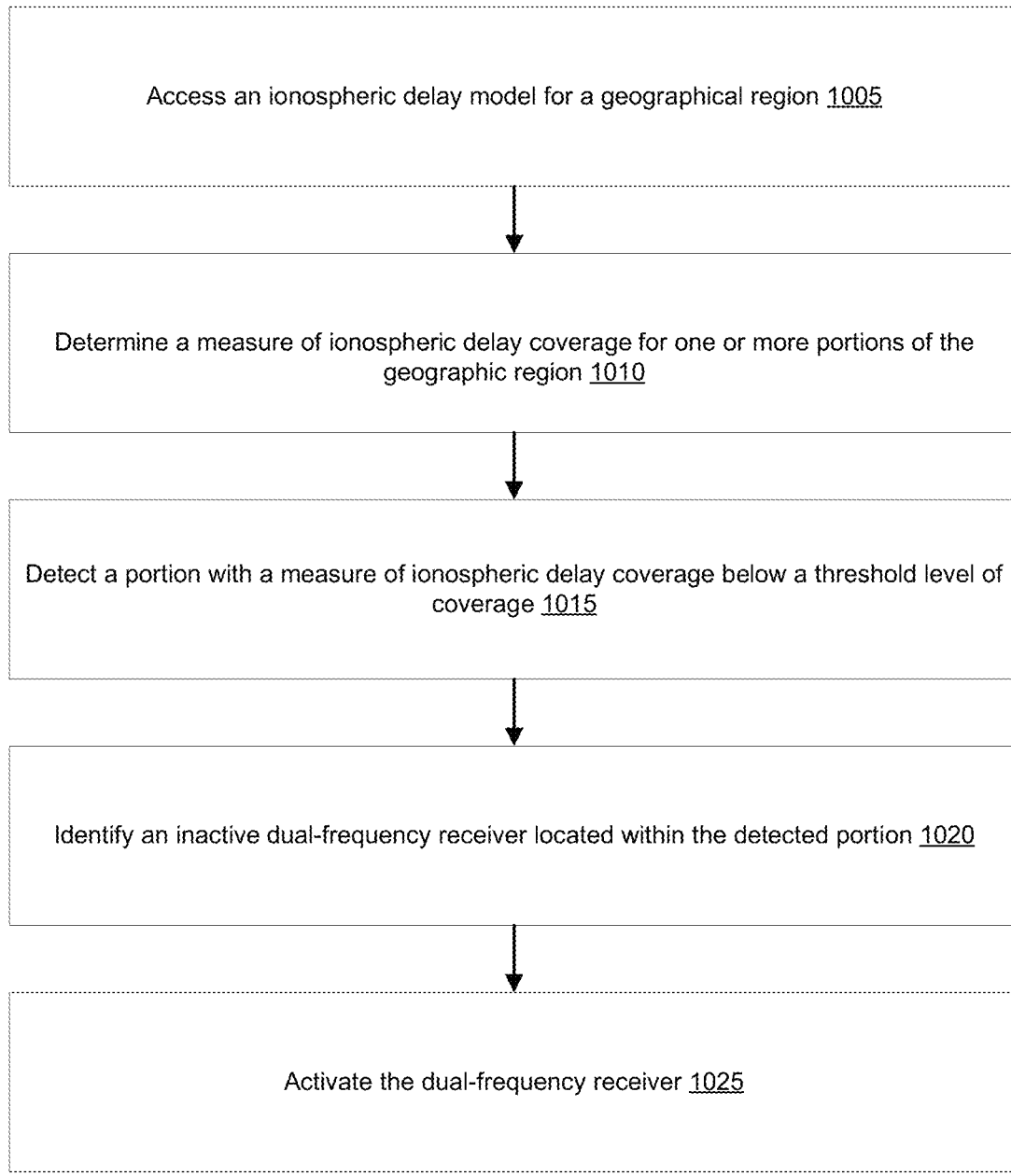
FIG. 10 is a flow chart illustrating a method providing a threshold level of ionospheric delay coverage to a portion of a geographic region, according to one embodiment.

FIG. 10 is a flow chart illustrating a method of providing a threshold level of ionospheric delay coverage to a portion of a geographic region. In the method shown, an ionospheric delay model for a geographical region is accessed 1005. A measure of ionospheric delay coverage for one or more portions of the geographic region is determined 1010 using the ionospheric delay model. A portion of the geographic region with a measure of coverage below a threshold level of coverage is detected 1015. In some embodiments, an inactive dual-frequency receiver location within the detected portion is identified 1020. The dual-frequency receiver is activated 1025 until the measure of coverage within the detected portion is greater than or equal to the threshold level of coverage. In alternative embodiments, a dual-frequency receiver within a threshold distance of the detected portion is identified. The dual-frequency receiver is activated and relocated to the detected portion. For example, an autonomous scooter with a dual frequency receiver may be programmed to relocate to the portion within the geographic region with insufficient ionospheric delay coverage. Alternatively, a user corresponding to the inactive dual-frequency receiver located outside of the detected portion may be identified and incentivized to relocate to the detected portion of the geographic region (e.g., by offering the user a financial incentive to relocate).

In some embodiments, the ionospheric delay model may be updated in response to the central location system 120 detecting a threshold change in atmospheric conditions of the geographic region. For example, changes in the ionosphere may be monitored at set time intervals, and based on a threshold change in the ionosphere, the ionospheric delay model may be updated. The central location system 120 may generate a user interface on a user device that includes a map of the geographic region and the measures of ionospheric delay coverage for one or more portions of the map.

Figure 11:
FIG. 11 is a flow chart illustrating a method of updating a receiver's location estimation, according to one embodiment.

FIG. 11 is a flow chart illustrating a method of updating a receiver's location estimation. In the method shown, a receiver receiving signals from two satellites within a geographic region is identified 1105. For example, a single- or dual-frequency receiver that is only able to receive unobstructed signals from two satellites is identified. In some embodiments, the receiver requests an updated location estimation from the central location system 120. An estimated location of the receiver is determined 1110 based, in part, on location data received by the central location system 120 from the receiver. Alternatively, the estimated location may also be based on location data received from other receivers and/or transmitters within the geographic region.

Additional receivers in the geographic region receiving signals from the two satellites are identified 1115. In certain preferred embodiments, there are at least four additional receivers in the geographic region that are identified. In other embodiments, there may be at least two or at least three additional receivers in the geographic region that are identified. The additional receivers may be single-frequency receivers or dual-frequency receivers. The additional receivers may be identified by receiving the estimated location of the receiver, identifying a set of candidate additional receivers within a threshold distance of the estimated location (based on last known locations of the candidate additional receivers), and identifying a subset of the candidate additional receivers that receive signals from the two satellites. Location data identifying a location of each of the additional receivers is received 1120 from each of the additional receivers (e.g., either directly for via the central location system 120).

An updated location estimation of the receiver is computed 1125 based on the location data of the additional receivers and the estimated location of the receiver. The updated location estimation may be based on i) a relative distance between the receiver and each of the additional receivers, ii) a line of sight distance between each additional receiver and each satellite, and/or iii) the estimate of the location of the receiver. In some embodiments, the updated location estimation of the receiver may be computed by computing double difference measurements of a location of the receivers and the locations of the additional receivers. In some embodiments, the updated location estimation of the receiver is computed by performing a least squares regression operation on the locations of the additional receivers and the estimated location of the receiver. For example, a differential regression operation may be performed using a Jacobian representative of the receiver's location with respect to the receiver's observables. The updated location estimation is provided 1130 to the receiver.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A method comprising:
    identifying, by a central location system, a first receiver receiving signals from two satellites within a geographic region;
    determining, by the central location system, an estimate of the location of the first receiver based on signals received from the two satellites;
    identifying, by the central location system, additional receivers in the geographic region receiving signals from the two satellites and at least one additional satellite,
    wherein each of the additional receivers receives signals from a greater number of satellites than does the first receiver;
    receiving location data identifying a location of each of the additional receivers;
    computing, by the central location system, an updated location of the first receiver,
    wherein computing the updated location comprises comparing the signals received by the first receiver or the estimate of the location of the first receiver to the location data of the additional receivers; and
    providing the updated location to the first receiver.

2. The method of claim 1, wherein the additional receivers comprise four additional receivers.

3. The method of claim 1, wherein computing the updated location of the first receiver further comprises performing a least squares regression operation on the locations of the additional receivers.

4. The method of claim 1, wherein computing the updated location of the first receiver comprises performing double difference operations on the estimate of the location of the first receiver and the locations of the additional receivers.

5. The method of claim 1, wherein computing the updated location of the first receiver comprises performing double difference operations on a location of the additional receivers and locations of the two satellites.

6. The method of claim 1, wherein computing the updated location of the first receiver is based on one or more of: a relative distance between the first receiver and each of the additional receivers, a line of sight distance between each of the additional receivers and each satellite, and the estimate of the location of the first receiver.

7. The method of claim 1, wherein computing the updated location of the first receiver further comprises performing a differential regression operation using a Jacobian representative of the estimate of the first receiver's location.

8. The method of claim 1, wherein identifying the first receiver comprises receiving a request from the first receiver for the updated location of the first receiver.

9. The method of claim 1, wherein identifying the additional receivers further comprises:
    receiving the estimate of the location of the first receiver;
    identifying a set of candidate additional receivers within a threshold distance of the received estimate of the location; and
    identifying a subset of the set of candidate additional receivers that receive signals from the two satellites.

10. The method of claim 1, wherein computing the updated location further comprises performing double difference operations.

11. A non-transitory computer-readable storage medium containing computer program code that, when executed by a hardware processor, causes the hardware processor to perform steps comprising:
identifying, by a central location system, a first receiver receiving signals from two satellites within a geographic region;
determining, by the central location system, an estimate of the location of the first receiver based on signals received from the two satellites;
identifying, by the central location system, additional receivers in the geographic region receiving signals from the two satellites and at least one additional satellite,
wherein each of the additional receivers receives signals from a greater number of satellites than does the first receiver;
receiving location data identifying a location of each of the additional receivers;
computing, by the central location system, an updated location of the first receiver,
wherein computing the updated location comprises comparing the signals received by the first receiver or the estimate of the location of the first receiver to the location data of the additional receivers; and
providing the updated location to the first receiver.

12. The non-transitory computer-readable storage medium of claim 11, wherein identifying the additional receivers further comprises:
receiving the estimate of the location of the first receiver;
identifying a set of candidate additional receivers within a threshold distance of the received estimate of the location; and
identifying a subset of the set of candidate additional receivers that receive signals from the two satellites.

13. The non-transitory computer-readable storage medium of claim 11, wherein the additional receivers comprise four additional receivers.

14. The non-transitory computer-readable storage medium of claim 11, wherein computing the updated location of the first receiver comprises performing a least squares regression operation on the locations of the additional receivers.

15. The non-transitory computer-readable storage medium of claim 11, wherein computing the updated location of the first receiver comprises performing double difference operations on the estimate of the location of the first receiver and the locations of the additional receivers.

16. The non-transitory computer-readable storage medium of claim 11, wherein computing the updated location of the first receiver comprises performing double difference operations on a location of the additional receivers and locations of the two satellites.

17. The non-transitory computer-readable storage medium of claim 11, wherein computing the updated location further comprises performing double difference operations.

18. The non-transitory computer-readable storage medium of claim 11, wherein the first receiver receives signals from only the two satellites, and at least one of the additional receivers receives signals from at least four satellites including the two satellites.

19. The non-transitory computer-readable storage medium of claim 18, wherein the location data identifying the location of each of the additional receivers is based on the signals from the greater number of satellites.

20. A system comprising:
a hardware processor; and
a non-transitory computer-readable medium containing instructions that, when executed by the hardware processor, cause the hardware processor to:
identify, by a central location system, a first receiver receiving signals from two satellites within a geographic region;
determine, by the central location system, an estimate of the location of the first receiver based on signals received from the two satellites;
identify, by the central location system, additional receivers in the geographic region receiving signals from the two satellites and at least one additional satellite,
wherein each of the additional receivers receives signals from a greater number of satellites than does the first receiver;
receive location data identifying a location of each of the additional receivers;
compute an updated location of the first receiver,
wherein computing the updated location comprises comparing the signals received by the first receiver or the estimate of the location of the first receiver to the location data of the additional receivers; and
provide the updated location to the first receiver.

21. The system of claim 20, wherein identifying the additional receivers further comprises:
receiving the estimate of the location of the first receiver;
identifying a set of candidate additional receivers within a threshold distance of the received estimate of the location; and
identifying a subset of the set of candidate additional receivers that receive signals from the two satellites.

22. The system of claim 20, wherein computing the updated location of the first receiver comprises performing double difference operations on a location of the additional receivers and locations of the two satellites.

23. The system of claim 20, wherein computing the updated location of the first receiver is based on one or more of: a relative distance between the first receiver and each of the additional receivers, a line of sight distance between each of the additional receivers and each satellite, and the estimate of the location of the first receiver.

24. The system of claim 20, wherein computing the updated location further comprises performing double difference operations.

25. A method comprising:
identifying, by a central location system, a first receiver receiving signals from a satellite within a geographic region;
determining, by the central location system, an estimate of the location of the first receiver based on signals received from the satellite;
identifying, by the central location system, additional receivers in the geographic region receiving signals from the satellite and at least one additional satellite,
wherein each of the additional receivers receives signals from a greater number of satellites than does the first receiver;
receiving location data identifying a location of each of the additional receivers;
computing, by the central location system, an updated location of the first receiver, wherein computing the updated location comprises comparing the signals received by the first receiver or the estimate of the location of the first receiver to the location data of the additional receivers; and providing the updated location to the first receiver.

26. The method of claim 25, wherein computing the updated location further comprises performing double difference operations.

* * * * *